(No Model.)

G. B. VAUGHAN.
ELECTRIC TRAP.

No. 590,121. Patented Sept. 14, 1897.

WITNESSES:
William P. Gaebel.
J. Fred Acker.

INVENTOR
G. B. Vaughan.
BY
Munn
ATTORNEYS.

UNITED STATES PATENT OFFICE.

GEORGE B. VAUGHAN, OF KIRKWOOD, MISSOURI.

ELECTRIC TRAP.

SPECIFICATION forming part of Letters Patent No. 590,121, dated September 14, 1897.

Application filed May 14, 1897. Serial No. 636,447. (No model.)

*To all whom it may concern:*

Be it known that I, GEORGE B. VAUGHAN, of Kirkwood, in the county of St. Louis and State of Missouri, have invented a new and Improved Electric Trap, of which the following is a full, clear, and exact description.

My invention relates especially to an animal-trap or a trap for nocturnal insects.

The object of the invention is to construct an electrically-operated trap in such manner that a platform is provided capable of access from any direction, which platform will constitute one terminal of an open electric circuit, the bait-holder constituting the other terminal of the electric circuit, whereby when the body of the insect or other creature comes in contact with the bait-holder and platform said body will close the circuit and the entire current will pass through the body and will tend to instantly kill the animal or insect.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
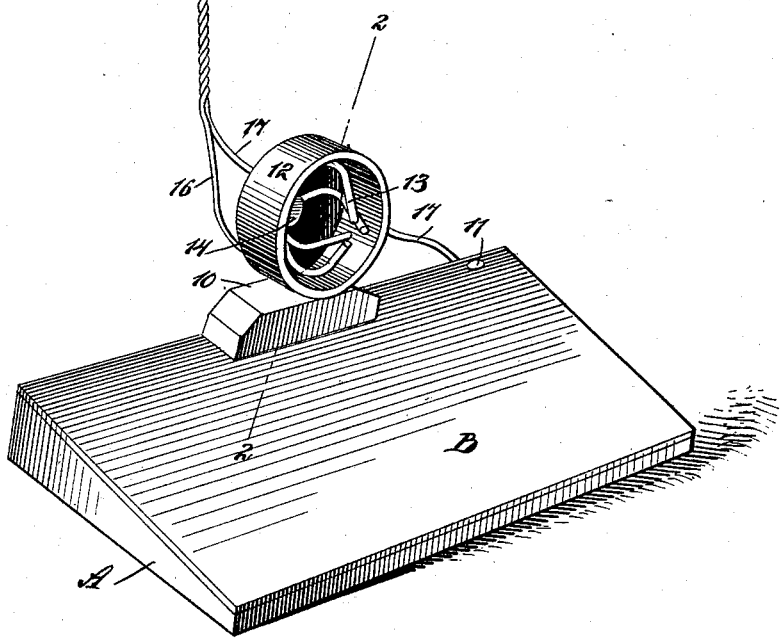
Figure 2:
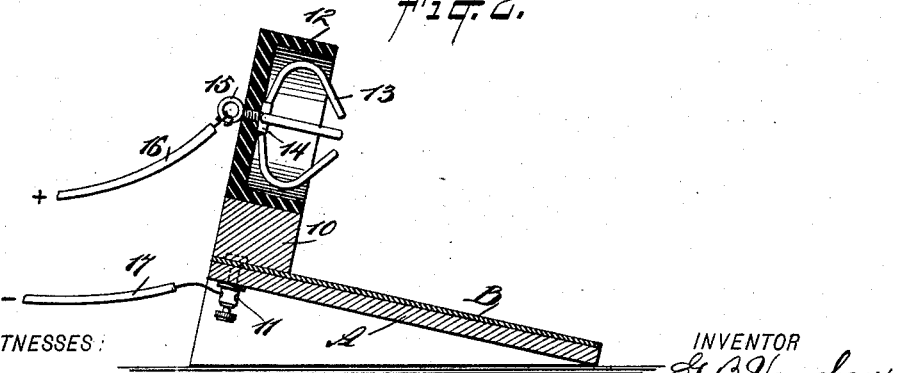

Figure 1 is a perspective view of the improved trap, and Fig. 2 is a vertical section on the line 2 2 of Fig. 1.

The base A of the trap is preferably given an inclined upper surface, and said upper surface is covered by a metal plate B, usually of copper. Ordinarily at the rear upper portion of the base, near its center, a block 10 is secured on the plate B, and on said block a casing 12 is secured. This casing is made from an insulating material, such as rubber, and is shown as of cylindrical form, open at the front and closed at the back. A binding-screw 11 is secured to the base, extending to a contact with the metal plate or cover B thereof.

Within the casing 12 a bait-holder 13 is located. This bait-holder is preferably made of a series of claws of copper or brass wire, or an equivalent material, projected from a disk 14, with which disk the shank of an eye 15 is connected, the shank extending through the back of the casing and the eye being at the rear portion of said casing.

Any suitable generator of electricity or an electrical supply may be employed—as, for example, a battery—and the wires leading to the positive and negative poles of the generator or source of electrical supply are designated by the signs + and −, and the said wires are designated, respectively, as 16 and 17. These wires are shown as connected with an attaching-block 18, adapted to be placed in communication with a socket 19, used in connection with an electric light, or, as stated, the wires may be connected with a battery or with other forms or sources of electrical supply. It will thus be observed that when the wires are in electrical connection an open circuit is provided, which will be closed by the animal contacting with the plate B and one of the members of the bait-receptacle 13. The platform, it will be observed, may be approached by animals or insects from all directions, and the bait-receptacle may be placed in such relation to the base B as may be found necessary, according to the character of the insect or animal to be electrocuted.

Having thus described my invention, I claim as new and desire to secure by Letters Patent—

1. An electrical trap, consisting of a platform which is a conductor of electricity, a bait-receptacle also a conductor of electricity, and an electric circuit, which includes a generator in connection with the platform and bait-receptacle, whereby a current of electricity will be caused to pass through the body of any creature brought in contact with the platform and bait-receptacle.

2. An electrical trap consisting of a platform which is a conductor of electricity, a casing of a non-electric conducting material, a bait-receptacle which is a conductor of electricity located in the said casing, and an electric circuit which includes a generator, connected with the platform and bait-receptacle.

3. An electrical trap consisting of a base, a metal plate carried by the base, a casing which is a non-conductor of electricity, supported upon said metal plate, a bait-receptacle consisting of a series of claws constructed of a material which is a conductor of electricity, and an electric circuit, including a generator, connected with the metal plate and with the bait-receptacle.

4. The combination, with an open base, a plate which is a conductor of electricity, secured upon the upper surface of said base, and a casing constructed of a material which is a non-conductor of electricity, of a bait-receptacle, consisting of a series of metallic claws located in said casing, a portion of the bait-receptacle extending through a wall of said casing, and an electric circuit which includes a generator, one wire of said circuit being connected with the projecting portion of the bait-receptacle, and the other wire being connected with the metallic plate, whereby an open circuit may be maintained, closed by the body of any creature contacting with said metallic plate and with said bait-receptacle.

GEORGE B. VAUGHAN.

Witnesses:
    MARIE C. JACOBI,
    LOUISE JACOBI.